(12) United States Patent
Truong et al.

(10) Patent No.: US 11,610,746 B2
(45) Date of Patent: Mar. 21, 2023

(54) COMPACT SWITCH

(71) Applicant: OPTIC CLEAR SOLUTIONS, LLC, Anaheim, CA (US)

(72) Inventors: Samkol Truong, Anaheim, CA (US); Roy Hart, Menifee, CA (US); Robert P. Helstern, Irvine, CA (US); Xavier Magdaleno, Bellflower, CA (US)

(73) Assignee: OPTIC CLEAR SOLUTIONS, LLC, Anaheim, CA (US)

( * ) Notice: Subject to any disclaimer, the term of this patent is extended or adjusted under 35 U.S.C. 154(b) by 0 days.

(21) Appl. No.: 17/894,746

(22) Filed: Aug. 24, 2022

(65) Prior Publication Data

US 2022/0406537 A1    Dec. 22, 2022

Related U.S. Application Data

(63) Continuation of application No. 17/074,692, filed on Oct. 20, 2020, now Pat. No. 11,462,369.

(51) Int. Cl.
*H01H 13/14*   (2006.01)
*H01H 13/02*   (2006.01)
*H01H 13/20*   (2006.01)
*G02B 5/20*   (2006.01)

(52) U.S. Cl.
CPC .............. *H01H 13/14* (2013.01); *G02B 5/20* (2013.01); *H01H 13/023* (2013.01); *H01H 13/20* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/16; H01H 2219/0622; H01H 2219/037; F21V 15/02; G02B 5/20; G02B 6/003; G02B 27/0172; G02B 2027/0178; G02B 6/0028; G02B 2027/0125; G02B 6/0055; G02B 6/0018; G02B 27/0101; G02B 27/0081; G02B 6/0056

See application file for complete search history.

(56) References Cited

U.S. PATENT DOCUMENTS

| | | |
|---|---|---|
| 6,667,451 B1 | 12/2003 | Hart |
| 6,770,829 B1 | 8/2004 | Hart |
| 8,232,492 B1 | 7/2012 | Davis et al. |
| 8,476,543 B2 | 7/2013 | Hart et al. |
| 2011/0290623 A1* | 12/2011 | Hart ..................... H01H 13/023 200/290 |

* cited by examiner

*Primary Examiner* — Ahmed M Saeed
(74) *Attorney, Agent, or Firm* — Paul D. Chancellor; Ocean Law

(57) ABSTRACT

A compact switch mechanism operating a contactor array and having a lighted display.

18 Claims, 13 Drawing Sheets

COMPACT SWITCH

PRIORITY CLAIM AND INCORPORATION BY REFERENCE

This application is a continuation of U.S. patent application Ser. No. 17/074,692 filed Oct. 20, 2020 and entitled Compact Switch. This application incorporates by reference, in their entireties and for all purposes, the disclosure of the following patents and patent application publications relating to switches: U.S. Pat. No. 8,476,543 filed May 6, 2011, U.S. Pat. No. 8,232,492 filed Sep. 26, 2008, U.S. Pat. No. 6,770,829 filed Oct. 2, 2003, and U.S. Pat. No. 6,667,451 filed Mar. 20, 2003.

BACKGROUND OF THE INVENTION

Field of the Invention

The present invention relates to an item of manufacture. In particular, an anti-tease pushbutton switch provides contactors for switching electrical loads and a high visibility lighted display.

Discussion of the Related Art

Pushbutton electrical switches are well-known. However, pushbutton switches that switch multiple circuits are less well-known as are pushbutton switches that incorporate lighting. When these features are combined with a novel switch mechanism and novel optics, a patentably distinct switch results.

SUMMARY OF THE INVENTION

Embodiments of the present invention provide a pushbutton switch with one or more of anti-tease operation, contactors for switching electrical loads, and a high visibility lighted display. The pushbutton may be lighted using an improved optical lens that redirects incident glare.

In an embodiment, a compact switch comprises: a pushbutton end and an electrical contact pin end with a housing extending therebetween; between the ends and within the housing, an anti-tease mechanism operated by an actuator rod extending away from the pushbutton end, the anti-tease mechanism operating a contactor array via an interposed rack; the actuator rod having a side projection extending into a curvilinear track in a cam movable with respect to the switch housing; between the ends, a flexible circuit with a loop below the pushbutton switch and passing between the anti-tease mechanism and the housing, the flexible circuit terminating at a first set of electrical contact pins protruding near the electrical contact pin end; a flexible circuit platform bearing light emitting diodes and between the loop and the electrical contact pins, the flexible circuit bearing capacitors, resistors, and rectifiers in circuits interconnecting the light emitting diodes and the first set of electrical contact pins; extending from the contactor array, a second set of electrical contact pins protruding near the electrical contact pin end; wherein during switch operation, the side projection moves in the curvilinear track such that contacts in the contactor array move between a first and a second state, the first and second states being bistable states.

In some embodiments, the compact switch comprises: first and second biasing springs; the cam between the first and second biasing springs; and, the actuator rod between the second biasing spring and a cam surface exposing the curvilinear track. In some embodiments, the first biasing spring is a spring plate and the second biasing spring is an open loop spring having gap between a first spring end and a second spring end. In some embodiments, the open loop spring is held such that it biases the actuator rod with a force attributable in part to fixation of the first and second spring ends.

In some embodiments the compact switch comprises: a fixing screw and a collar; wherein the compact switch is mountable using the fixing screw passing through the collar, one or both of the fixing screw and collar heated to pass the screw through the collar and one or both of the fixing screw and the collar cooled to fix the screw in the collar.

In some embodiments, the compact switch comprises: a pushbutton display assembly including a lens assembly; the lens assembly having a viewable side and a lighted side; the viewable side being an outermost surface of a primary lens; the lighted side being an outermost surface of a secondary lens; the primary lens innermost surface facing an indicia layer; and, the secondary lens innermost surface facing an adhesive layer; wherein the primary lens thickness is between 0.020 and 0.025 inches, the indicia layer thickness is between 0.002 and 0.006 inches, the adhesive layer thickness is less than 0.001 inches, and the secondary lens thickness is between 0.105 and 0.130 inches.

In some embodiments, the primary lens is made from cell cast PMMA with 1 to 2 percent molecular cross linking and includes ultra-violet light absorbing dyes for absorbing about 95% of the incident spectral irradiance. In some embodiments the primary lens outermost surface includes pattern scoring that measures 70-80 gloss units. In some embodiments, primary lens glare control is about 2 to 3 percent of incident light intensity when the incident light is directed at 45 degrees relative to normal viewing. In some embodiments, the primary lens innermost surface includes pattern scoring that measures 60-65 gloss units.

In some embodiments, the indicia layer provides digitally printed readable characters using a UV curable ink with a first or foreground color that is optically translucent and constructed by an RGB color component ratio system. In some embodiments, the indicia layer includes a second or background color that is optically opaque and constructed by an RGB color system. In some embodiments, photopic light transmittance of the first color is varied while photopic light transmittance of the second color is less than 0.001 percent.

In some embodiments, the adhesive layer includes a UV curable component.

In some embodiments, the secondary lens includes clear cell cast PMMA. In some embodiments, the secondary lens includes absorption dyes for the near infrared portion of the electromagnetic spectrum. In some embodiments, the secondary lens excludes absorption dyes for the ultraviolet portion of the electromagnetic spectrum. In some embodiments, the secondary lens spectral transmission is less than 10 percent above 700 nm, less than 10 percent below 250 nm, and more than 75% between 350 and 550 nm. In some embodiments, the UV curable adhesive layer is curable by exposing the outermost surface of the secondary lens to UV light but is not curable by exposing the outermost surface of the primary lens to UV light.

BRIEF DESCRIPTION OF THE DRAWINGS

The present invention is described with reference to the accompanying figures. These figures, incorporated herein and forming part of the specification, illustrate some embodiments of the invention and, together with the description, further serve to explain its principles enabling a person skilled in the relevant art to make and use the invention.

DETAILED DESCRIPTION OF PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the terms "coupled" and "attached" include direct and indirect connections. Moreover, where first and second devices are coupled or attached, intervening devices including active devices may be located therebetween.

Figure 1A:
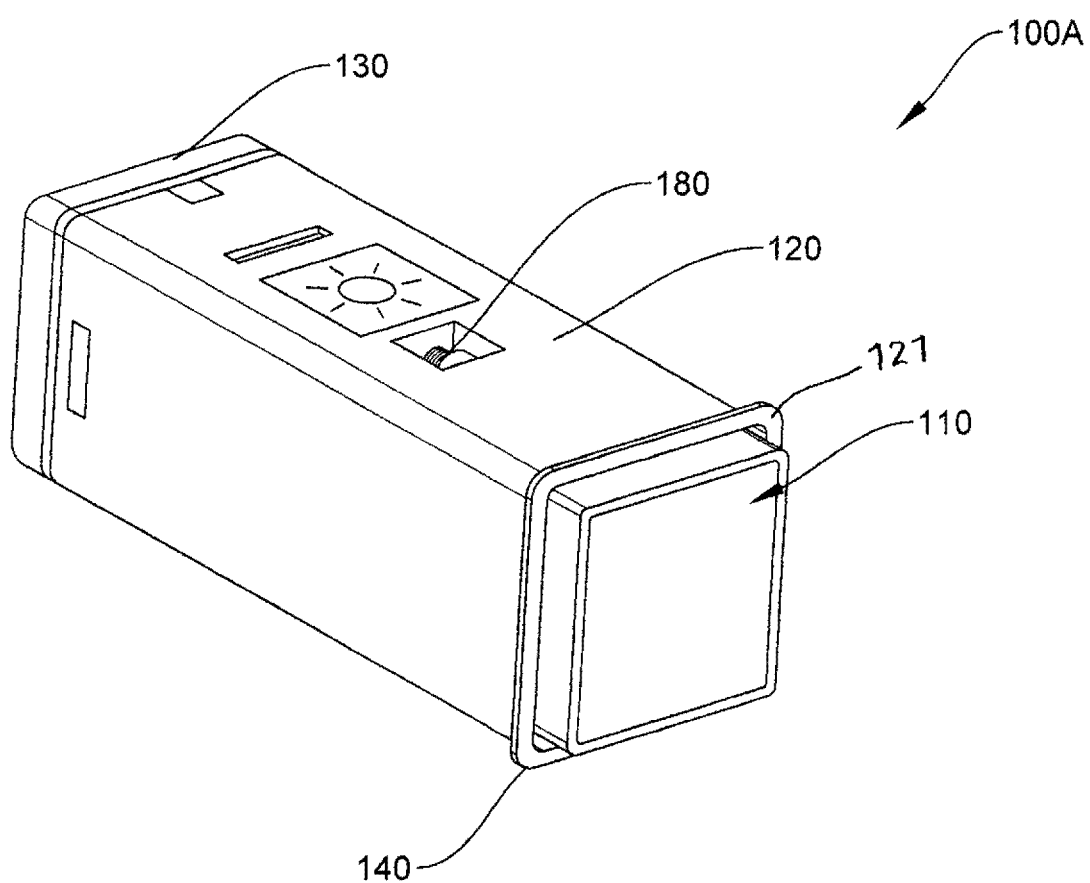
FIG. 1A-B show perspective views of a switch front and a switch rear in accordance with some embodiments the present invention.

FIG. 1A shows a front view of an assembled compact switch 100A. A lighted display assembly 110 protrudes from one end 121 of a housing 120. A lip 140 around this end of the housing may provide a mounting flange. Connections with electronics within the housing are made with the end connector 130.

Figure 1B:
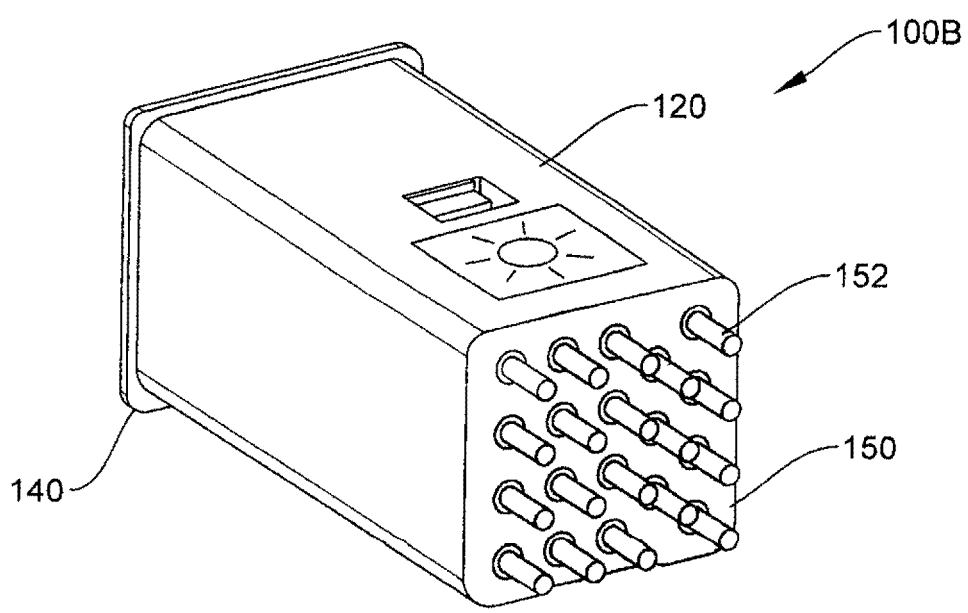

FIG. 1B shows an end view of an assembled compact switch 100B. Pins 152 protrude from a switch pin base 150 and are for mating with a connector such as the end connector 130.

Figure 2A:
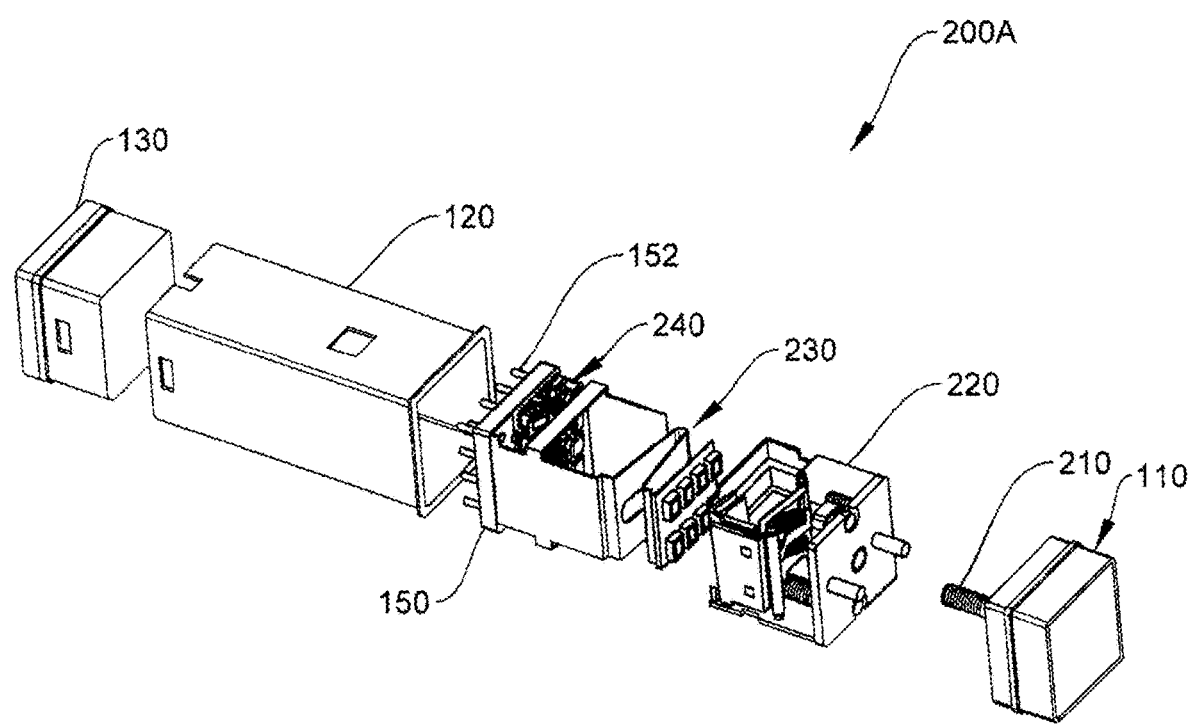
FIGS. 2A-D show switch mechanism views in accordance with some embodiments of the present invention.

FIG. 2A shows an exploded diagram of the compact switch 200A. Switch parts include the lighted display assembly 110, an actuator rod 210 protruding from this assembly, a cam and anti-tease assembly 220, a flexible circuit assembly 230, a contactor assembly 240, a switch pin base 150, a housing 120, and a mating connector 130.

Figure 2B:
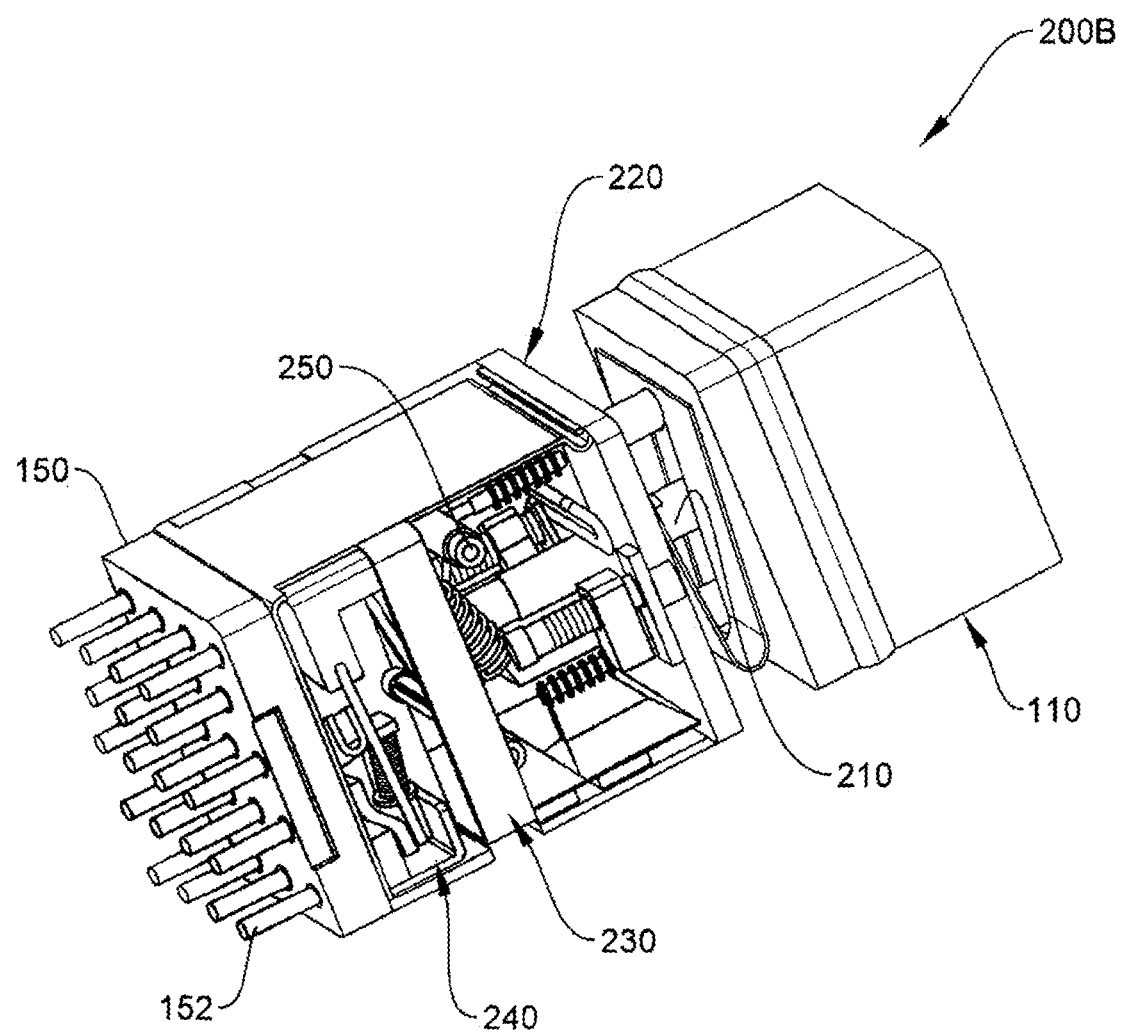

FIG. 2B shows a compact switch assembly cross-section with the housing removed 200B. This figure shows the cam and anti-tease assembly 220 between the lighted display assembly 110 and the contactor assembly 240 with the actuator rod 210 extending therebetween.

Figure 2C:
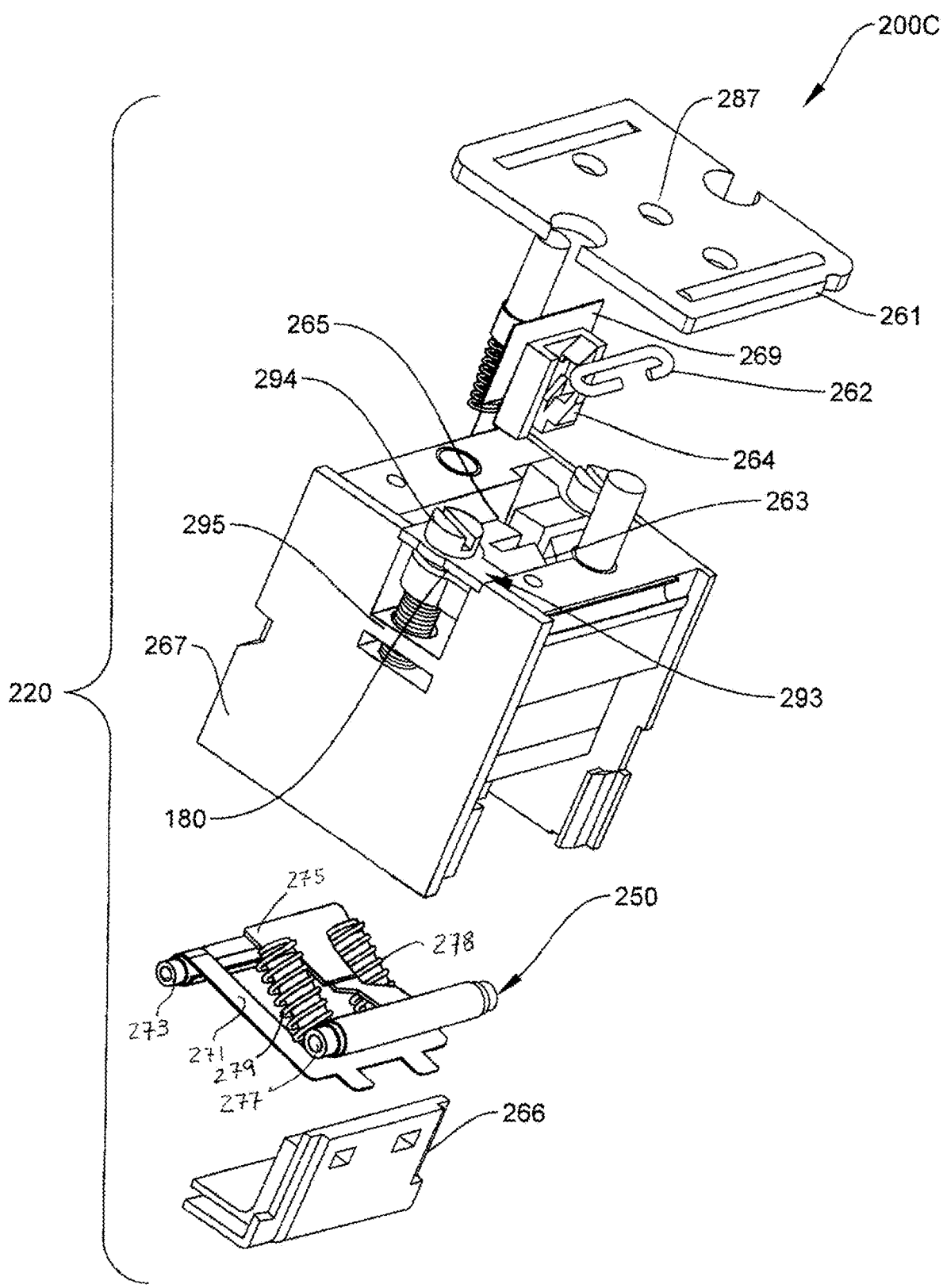

FIG. 2C shows an exploded view of the cam and anti-tease assembly 200C. The cam and anti-tease assembly 220 includes a sub-housing 267 holding the cam 264 and the anti-tease assembly 250. The cam is between a first biasing spring or bowed spring plate 269 and second biasing spring such as an opposed "C" shaped or open loop spring 262. The open loop spring ends or end portions may be fixed such that its spring constant depends on all or substantially all of the length of the spring. The cam and spring plate are for fitment into a first housing chamber 265 and the C spring is for fitment into a second housing chamber 263. The actuator shaft 210 passes through a hole 287 in a sub-housing cap 261 and moves up and down between the cam and the C spring.

Below the cam 264 is the anti-tease assembly 250 which is also for fitment in the sub-housing 267. The anti-tease assembly includes a primary actuator lever 271 with a pivoted end 273 and a secondary actuator lever 275 with a pivoted end 277. The secondary actuator lever includes biasing springs 278, 279 interconnecting the actuator levers. The anti-tease assembly moves a rack 266 up and down to change the state/position of the contact assembly 240 (see FIG. 2B).

A sub-housing side assembly 293 includes tang 180 that passes through the housing to provide a means for securing the sub-housing 267 and/or the entire compact switch to a mounting panel (not shown). For example, the sub-housing side assembly may "stretch" the compact switch between the flange 140 (see FIG. 1A) and a mounting panel fix point. In various embodiments the sub-housing side assembly includes a fixing screw 294 which is passable through a plastic, thermoplastic, or elastomeric collar 295. In various embodiments, the collar and/or fixing screw is heated when the screw is inserted in the collar such that a cooled collar and/or fixing screw more tightly captures the screw to prevent unintended movement of the compact switch with respect to the panel.

Figure 2D:
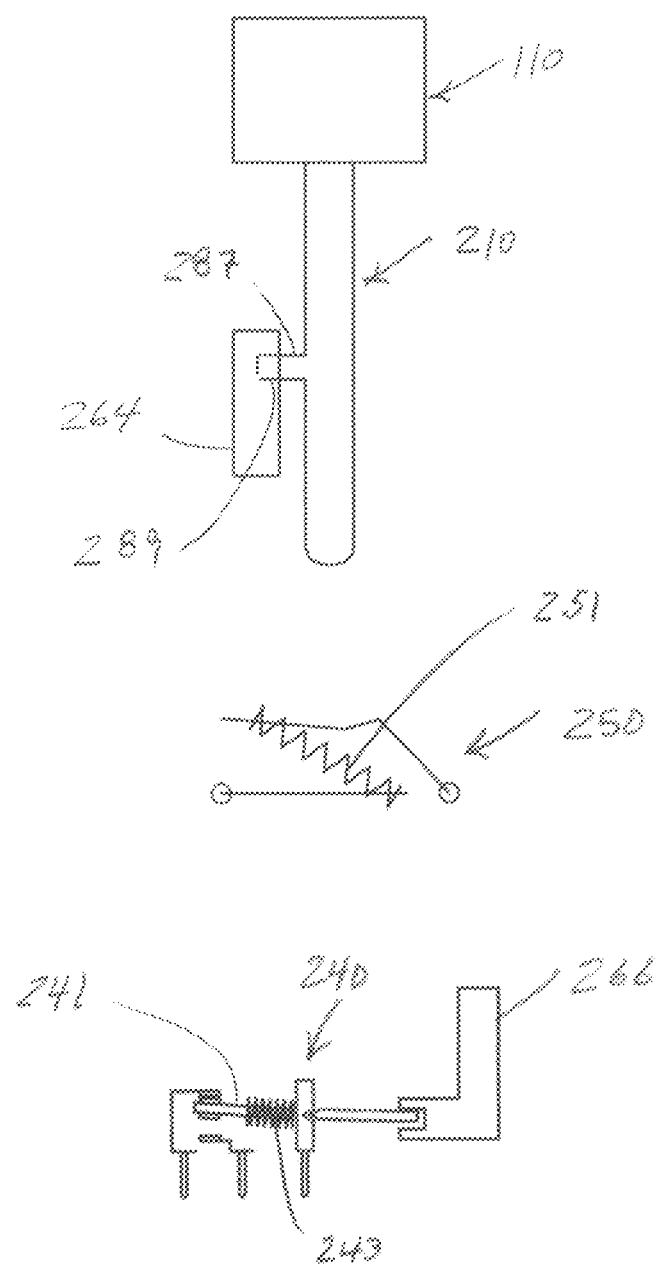

FIG. 2D shows a symbolic diagram of exemplary switch mechanism parts 200D. As seen, an actuator rod 210 extends from a pushbutton assembly. An actuator side projection or arm 287 extends into a curvilinear track 289 of a cam 264 and an end of the actuator rod is for bearing on an anti-tease mechanism 250 which may have one or two compression springs 251. The anti-tease mechanism is for moving a rack 266 engaging the contactor(s) 241 in a contactor array 240 up and down. In various embodiments, the contactor array includes one or more contactors 241, each having a moving contact and each for engaging upper and lower contacts according to rack position. In various embodiments, each contactor includes a compression spring 243.

Notably, the switch mechanism parts 200D provide for a tactile, snap action or tease proof switch. In an embodiment, the mechanism provides for an operating force of approximately 2 to 4 pounds and an operating stroke of approximately 0.130 inches where the approximation considers, among other things, tolerances in spring rates and dimensional tolerances in mechanism parts.

Figure 3A:
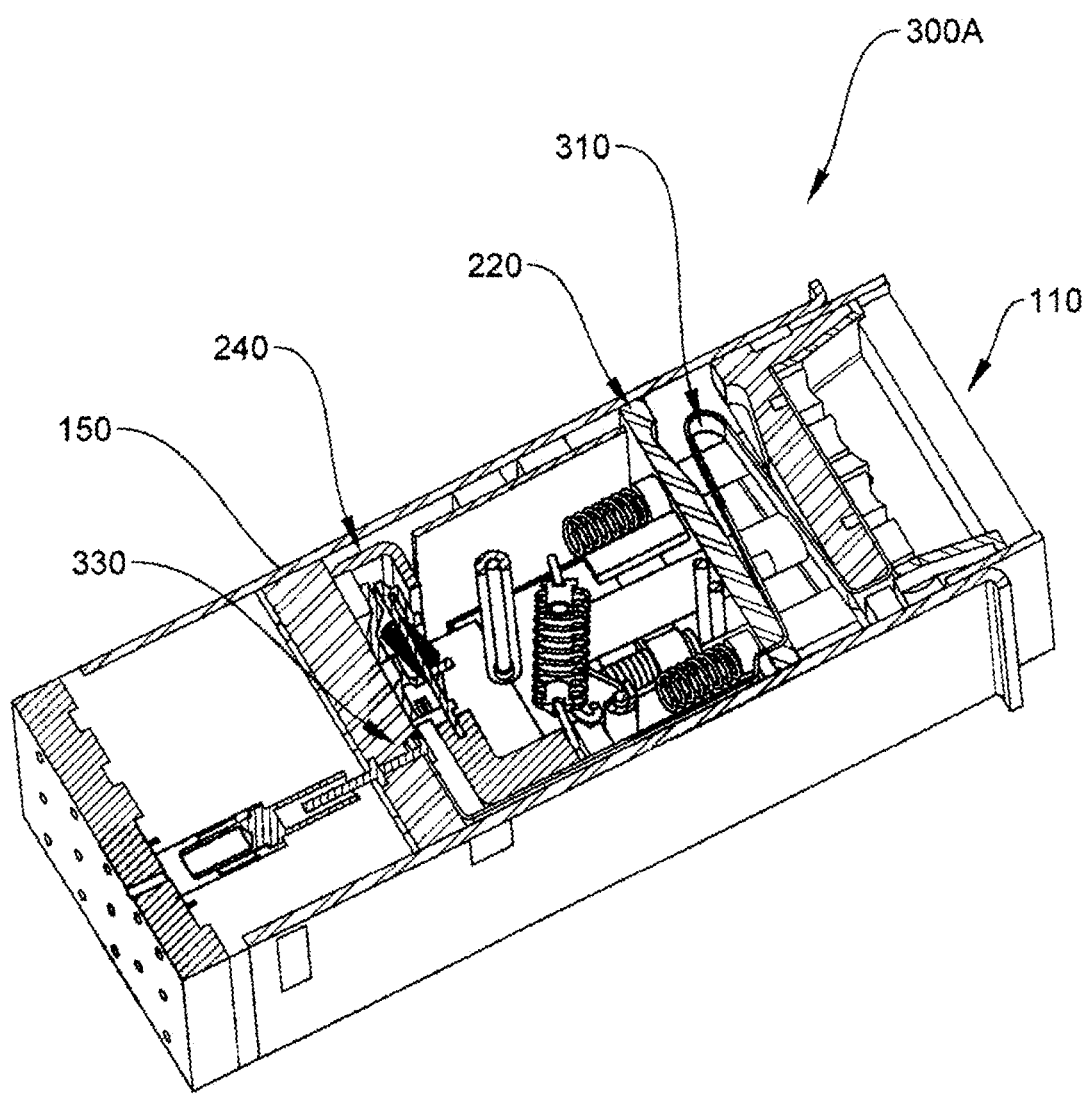
FIGS. 3A-C show switch electrical views in accordance with some embodiments of the present invention.

FIG. 3A shows another compact switch cross-section exposing an internal flex circuit 300A. The internal flex circuit 310 is folded between the pushbutton assembly 110 and the cam and anti-tease assembly 220. The flex circuit continues around the cam and anti-tease assembly to the switch pin base and to electrical pins 330 extending from the switch pin base.

Figure 3B:
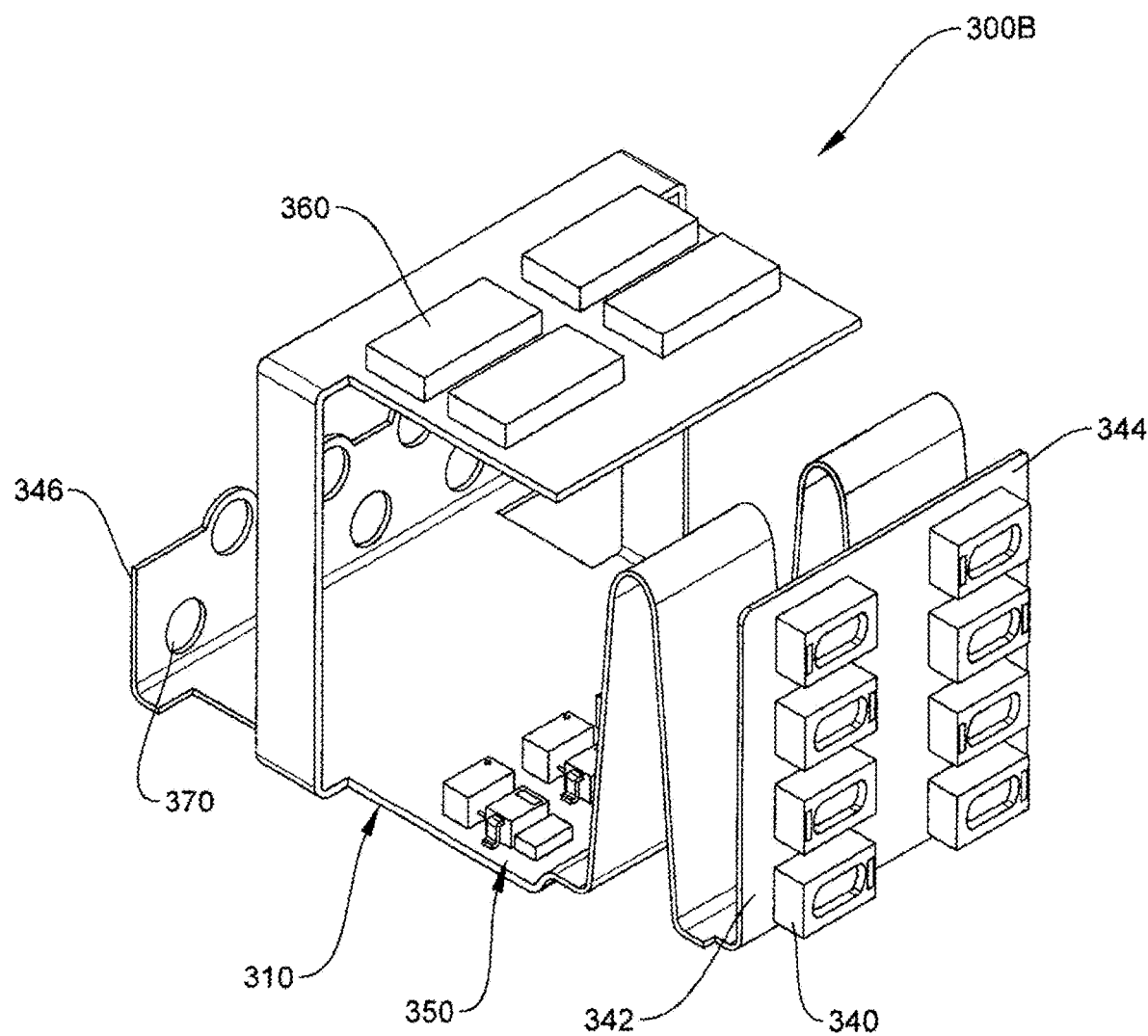

FIG. 3B shows the flex circuit removed from the switch 300B. At one end 344, the flex circuit includes a platform 342 on which lighting elements 340 such as LEDs are mounted. The lighting elements may be contained by the pushbutton assembly 110. At an opposite end 346, flex circuit electrical circuits 370 are for connecting with the electrical pins 330.

Between the two ends 344, 346 of the flex circuit 310 various electrical components may be used in driving LED lighting elements 340. These devices may be included in the circuits interconnecting the LED's with the electrical pins 330. For example, an LED or multiple LED's may use a drive circuit including a rectifier and a Zener diode 350. For example, an LED or multiple LED's may use a drive circuit including a power dissipating resistor 360.

Figure 3C:
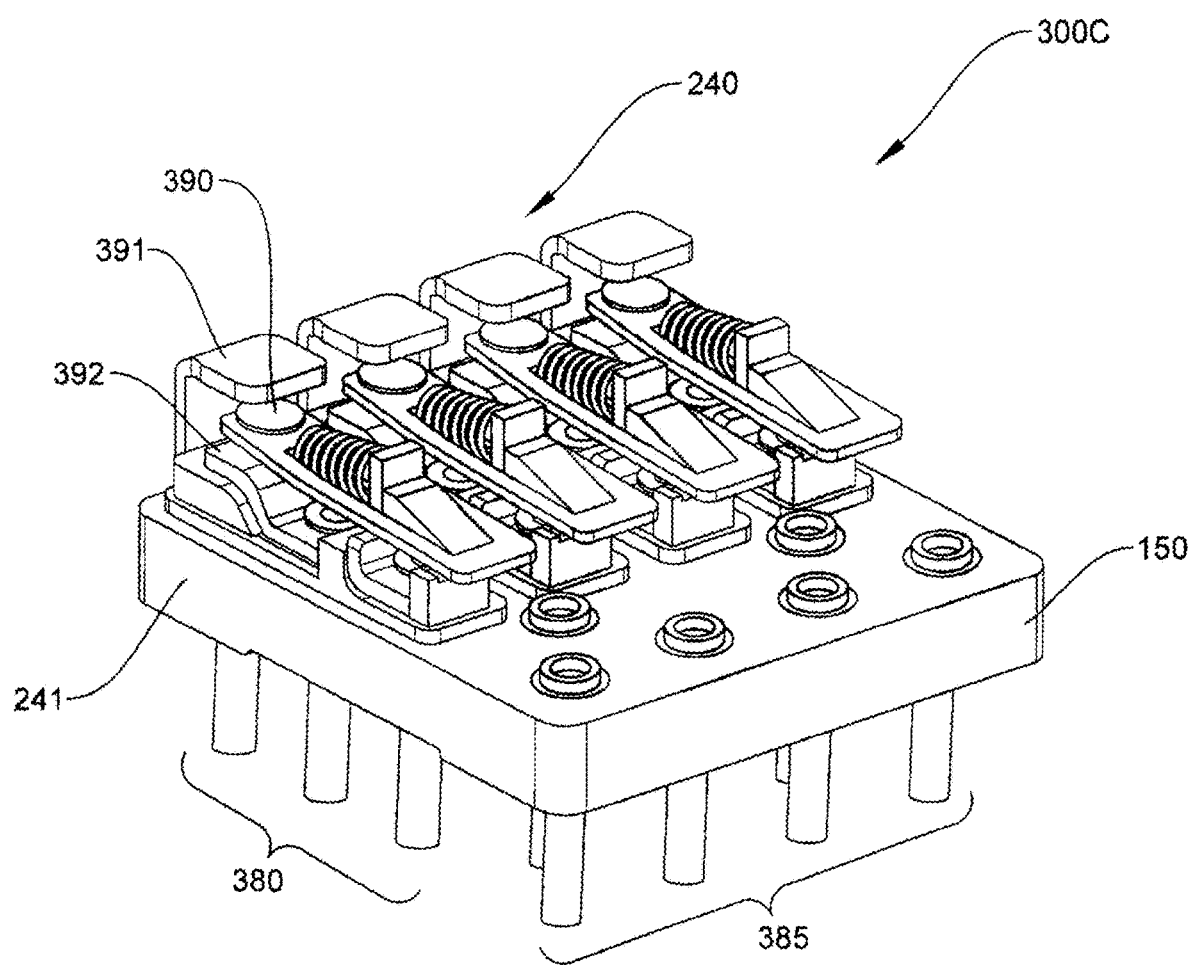

FIG. 3C shows the contactor array with four contactors 300C. In the figure, a switch pin base 150 includes an array of contactors 240. Each contactor 241 in the array interfaces with three electrical pins 380 interconnecting with the contactor moving contact 390, upper contact 391, and lower contact 392. Electrical pins 385 are for interfacing with the flex circuit 310.

In some embodiments, switch specifications include one or more of a) contactors are rated at 10 Amperes resistive and 5 Amperes inductive as specified in MIL-PRF-22885, b) MIL-C-39029 electrical interconnect, c) 4 pole double throw, d) alternate and momentary action, e) design weight of 15 or less grams, 0 square cross section, g) lighting operation at 5 and 28 volts AC/DC and h) lighting operation at 115 volts AC.

Figure 4A:
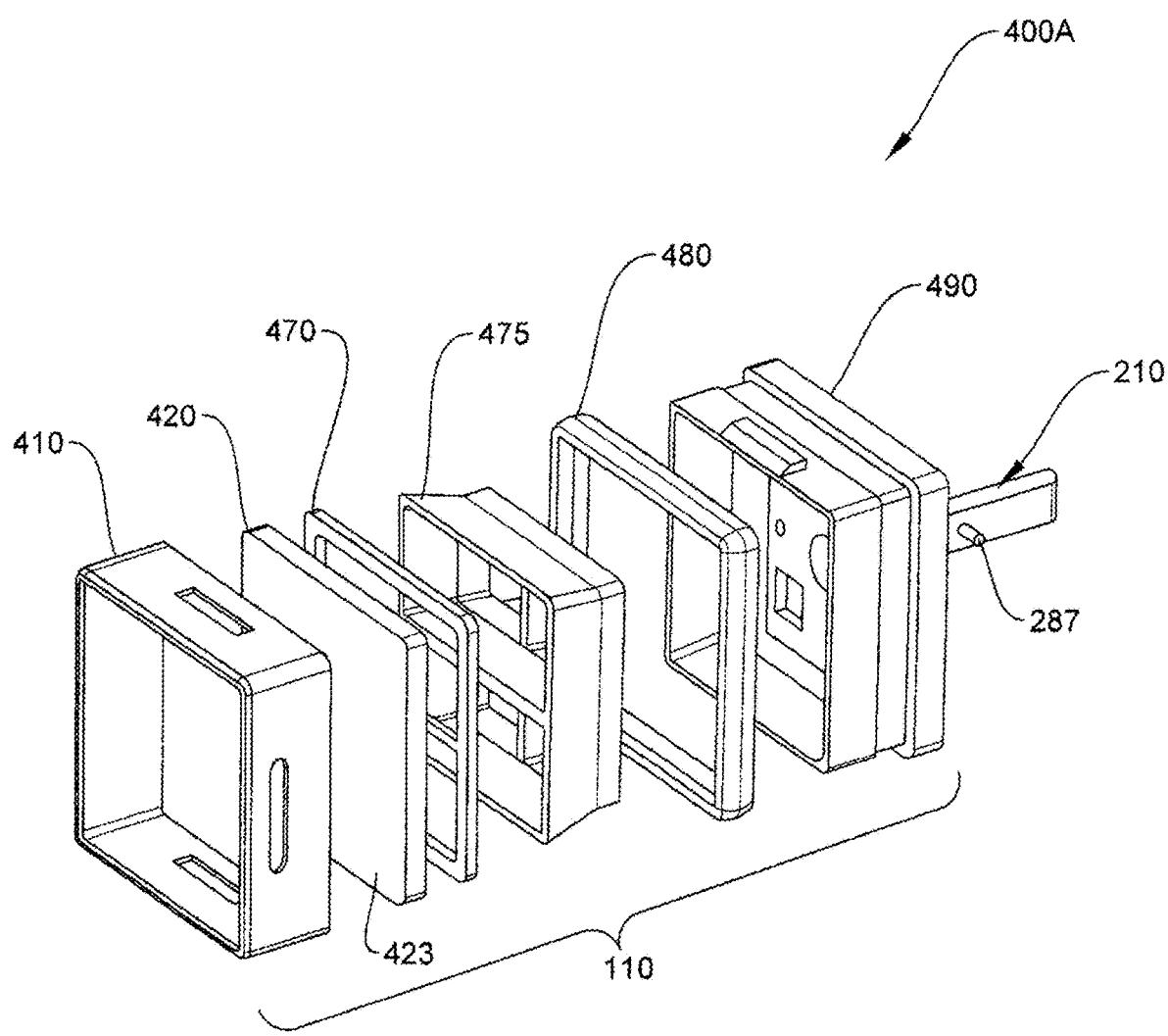
FIGS. 4A-B show switch optics in accordance with some embodiments of the present invention.

FIG. 4A shows a lighted pushbutton assembly and actuator rod 400A. The lighted pushbutton assembly 110 includes a cap 410 and a cap base 490. Between these structures is a lens assembly 420, a first spacer 470, a divider forming light chambers 475, and a second spacer 480. Extending from the pushbutton assembly is an actuator rod 210 with a side projection 287.

Figure 4B:
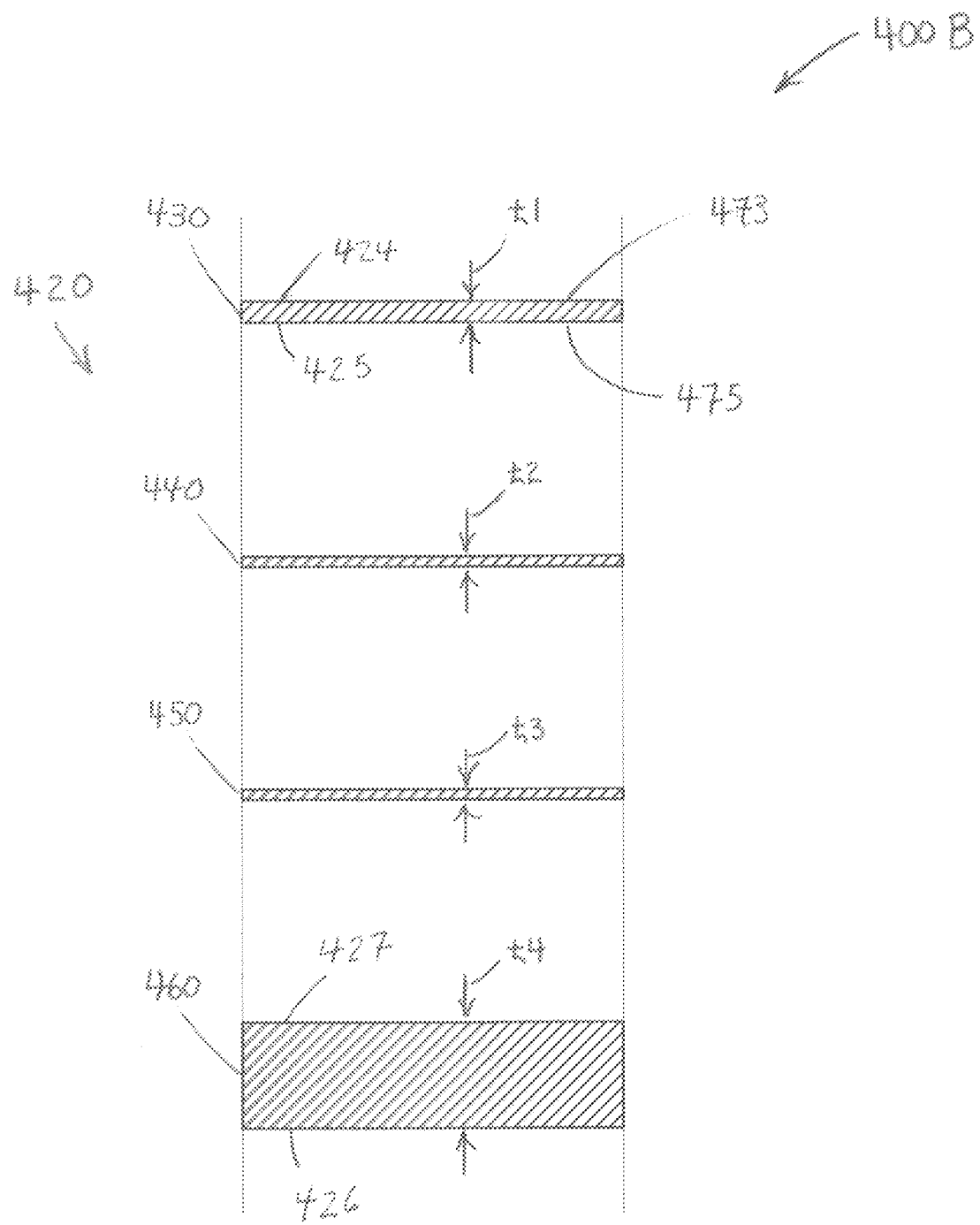

As seen in FIG. 4B, the lens assembly 420 includes a primary lens layer 430 and a secondary lens layer 460 with upper 424 and lower 425 surfaces. Between the lens and the secondary lens is an indicia layer 440 and an adhesive layer 450 with upper 427 and lower 426 surfaces.

The primary lens 430 may have a thickness t1 of approximately 0.020-0.025 inches. The indicia layer 440 may have a thickness t2 of 0.002-0.006 inches. The adhesive layer 450 may have a thickness t3 of less than 0.001 inches. The secondary lens may have a thickness t4 of 0.105-0.130 inches. In some embodiments, the primary lens, indicia layer, adhesive layer and secondary lens has an assembled thickness of 0.125-0.150 inches.

The primary lens 430 may be disposed as an outermost component in the lens assembly 420. The primary lens may include or be formed from an optically clear, UV resistant, and chemical resistant material. The primary lens may include or be formed from polymethylmethacrylate (PMMA) or chemical resistant cell cast PMMA. PMMA may be used in this application because of its relatively high light transmission characteristics, machining or cutting compatibility, durability, and low mass with high flexibility at thin cross-sections.

The primary lens 430 may include or be formed from an impact modified polymer such as PMMA that is comprised of 1-2% molecular cross linking and includes ultra-violet light absorbing dyes that can absorb approximately 95% of the incident ultraviolet spectral irradiance. The primary lens may be designed for or operable for absorbing ultra-violet light in the 200 nm to 400 nm portion of the electromagnetic spectrum.

Figure 5A:
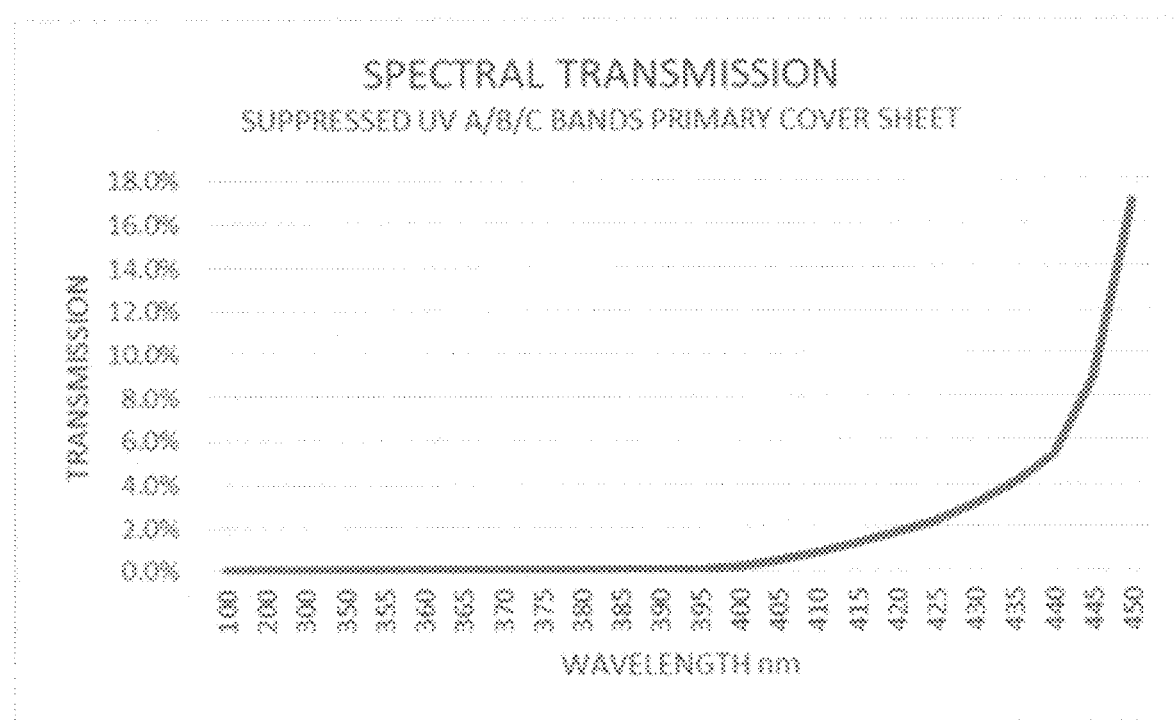
FIGS. 5A-C show performance of switch optics in accordance with some embodiments of the present invention.

FIG. 5A shows an example of operation in the 200 nm to 400 nm portion of the electromagnetic spectrum 500A. Here, primary lens spectral transmission is suppressed in UV A/B/C bands. Among other things, UV light absorption in this bandwidth is effective to mitigate yellowing of the plastic for 25-30 years of sunlight exposure. For example, absorption may be 95% minimum per ASTM-D-4802.

Materials other than PMMA may be used and/or manufacturing processes other than cell cast may be used. These include extruded or molded material such as PMMA or other acrylics or other optically clear polymers. However, material mechanical properties such as sufficient hardness required for machining/cutting and surface durability, often lacking in these alternatives, may be required.

Other polymer based optically clear plastics such as polycarbonate may be utilized. However, manufacturing techniques and manufacturing costs associated with high strength polycarbonate laminates having adequate resistance to anticipated lap shear forces make this material less desirable.

The primary lens 430 may include pattern scoring 473 on the outermost surface 424 to manage glare. The pattern may appear as a fine randomized grain having the approximate microscopic appearance to that of an orange peel texture. In an embodiment, the pattern is effective in managing incident glare while maintaining excellent readability of the indicia. For example, the amount of glare control is approximately 2-3% of incident light intensity when directed at 45 degrees relative to normal or perpendicular viewing.

Tolerances on the overall thickness range of the primary lens may not be greater than commercial manufacturing tolerances of approximately +/−15%. In an embodiment, the thickness t1 is in the range of 0.020-0.025 inches. Other thickness may be utilized. However, limiting the thickness to the minimum required for structural integrity may avoid problems associated with the phenomenon of excessive internal reflectance causing distortion of the readability aspect of the indicium. In some embodiments, the effective range of glare management of the patterned finish of the present invention is 70-80 gloss units. Gloss units are a relative measurement per ASTM D523. Gloss units referred to in this disclosure are relative to a 60/60 degree included angle gloss meter. The instrument used to determine gloss was the Bik/Gardner gloss meter and NIST traceable gloss standard.

Other primary lens 430 grain sizes may be used. But, a grain may be limited to approximately 80 gloss units, for example where readability of the indicia under strong ambient light is required while holding the diffused reflectance value of the grained surface to about 3% maximum. For example, lowering the GU response of a surface grain such as the primary lens grain 473 can act in part as an unacceptable aberration of the viewing surface resulting in interference with indicia readability when subjected to high ambient or incident sunlight.

The indicia layer 440 is disposed between the primary lens 430 and the secondary lens 460. The indicia layer provides readable characters. In an embodiment, the indicia layer is a contrasting material such as an ink. In an embodiment, the indicia layer 440 is or includes a UV curable ink that adheres well to the patterned grain 475 on the innermost side of the primary cover layer 425. The indicia layer 440 can be applied many ways commercially.

In an embodiment, the indicia are formed by digital printing for example with compatible UV curable ink. In an embodiment, a grain or patterned grain 475 is formed on the primary lens innermost side 425 and in an embodiment the patterned grain has gloss of 60-65 gloss units. Notably, the grain may aid in adhesion of the primary layer to the indicia 440 and/or the secondary lens.

Likewise, and in accordance with one of the features of the invention, the cross section of the indicia layer 440 may be limited to approximately 0.002" to 0.006" in thickness. Notably, limiting thickness enhances first color light transmission and maintains excellent opacity for the second color such that under incident light reflection, readable contrast of the indicia is promoted. Regarding readable contrast, the daylight contrast between indicia and background is described in MIL-DTL-7788, paragraph 3.7.2 for non-lighted white indicia appearing against a black non-lighted background as tested relative to incident light directed at a 45 degree angle in accordance with MIL-DTL-7788 FIG. 4.

In an embodiment, the indicia layer 440 having a thickness t2 is formed in the first or foreground color and a second or background color simultaneously. The formulae associated with the first color may be optically translucent and constructed by an RGB color component ratio system. Similarly, the formulae for the second color may be optically opaque and constructed by an RGB color system. In various embodiments the photopic light transmittance of the first color can be varied while the photopic light transmittance of the second color is less than 0.001% to maintain opacity and provide visual contrast with the first color.

Notably, scientific color system principles in the aerospace industry are based on the 1931 CIE color coordinate system and the 1976 UCS uniform color space coordinate system. These systems describe color in the context of graphic reference coordinate systems and are typically used in aerospace equipment manufacturers color specifications to provide product color specifications.

Since digital printing equipment utilizes RGB color component ratios in software to determine what color to print, both 1931 CIE and 1976 UCS coordinate requirements can be translated to RGB ratios by direct algebraic manipulation. Notably, this translation can eliminate the need to provide a physical color filter layer within a lens assembly 420 or layered stack up.

The adhesive layer 450 is a UV curable adhesive and is disposed between the indicia layer 440 and the secondary lens sheet 460. In other embodiments, other forms of adhesives such as non-UV curable adhesive films or liquids could be utilized. However, care must be taken to avoid destruction/degradation of the indicia layer 440 by the adhesive layer, for example destruction by chemical reaction therebetween or by corrosive action on commercial paints and inks.

The secondary lens 460 having an innermost side 427 and an outermost side 426 may be disposed as an innermost component in the lens assembly 420. The secondary lens may include or be formed from an optically clear and chemical resistant material. The secondary lens may be UV resistant. The secondary lens may include or be formed from polymethylmethacrylate (PMMA) or chemical resistant cell cast PMMA. PMMA may be used in this application because of its relatively high light transmission characteristics, machining or cutting compatibility, durability, and/or low mass with high flexibility at thin cross-sections.

The secondary lens 460 is laminated via the adhesive layer 450. Adhesive layer bonding may be by UV light passing through the secondary lens. For example, UV light may be incident on the secondary lens to cure one or more of the indicia layer 440 and the adhesive layer 450 where transmission of UV light is blocked or substantially blocked by the primary lens 430.

The secondary lens may be operated as the back plane of the lens assembly 420. In an embodiment, the thickness t4 of the secondary lens 460 is 0.105-0.130". While other thickness may be utilized, it is noted that doubling secondary lens thickness t4 as compared to the primary lens 430 thickness t1 provides an adequate structure and/or means of supporting the lens assembly 430 and a means of mounting if needed.

Figure 5B:
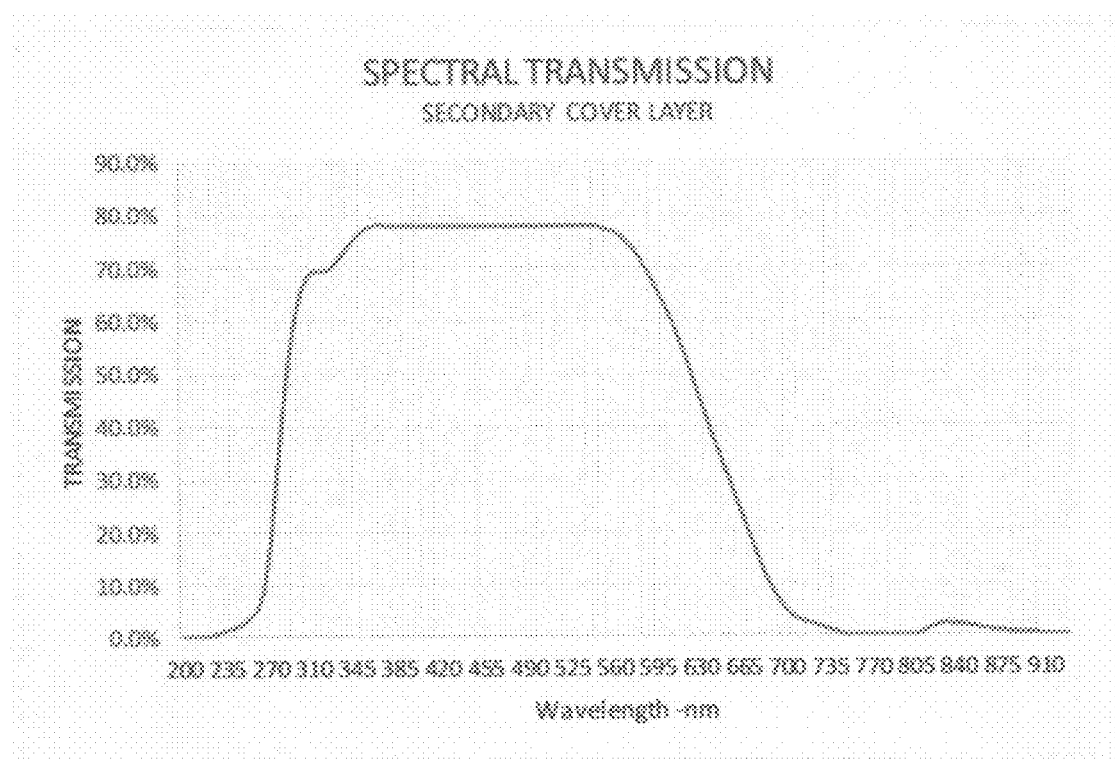

As seen in FIG. 5B, the secondary lens 460 may be designed to manage transmission of spectral energy 500B. Here, the spectral energy transmission characteristics are provided by formulations with the secondary lens cooperating with the indicia layer or indicia color. For example, secondary lens composition can include one or more polymers. For example, the secondary lens spectral transmission may be as much as 80% in the visible spectrum. For example, the secondary lens spectral transmission may be <10% above 700 nm, <10% below 250 nm, and above 75% between 350 and 550 nm.

For example, the secondary lens may be formed from clear PMMA without UV absorption dyes but with absorption dyes in the near infrared portion of the electromagnetic spectrum to enable use of night vision devices.

Figure 5C:
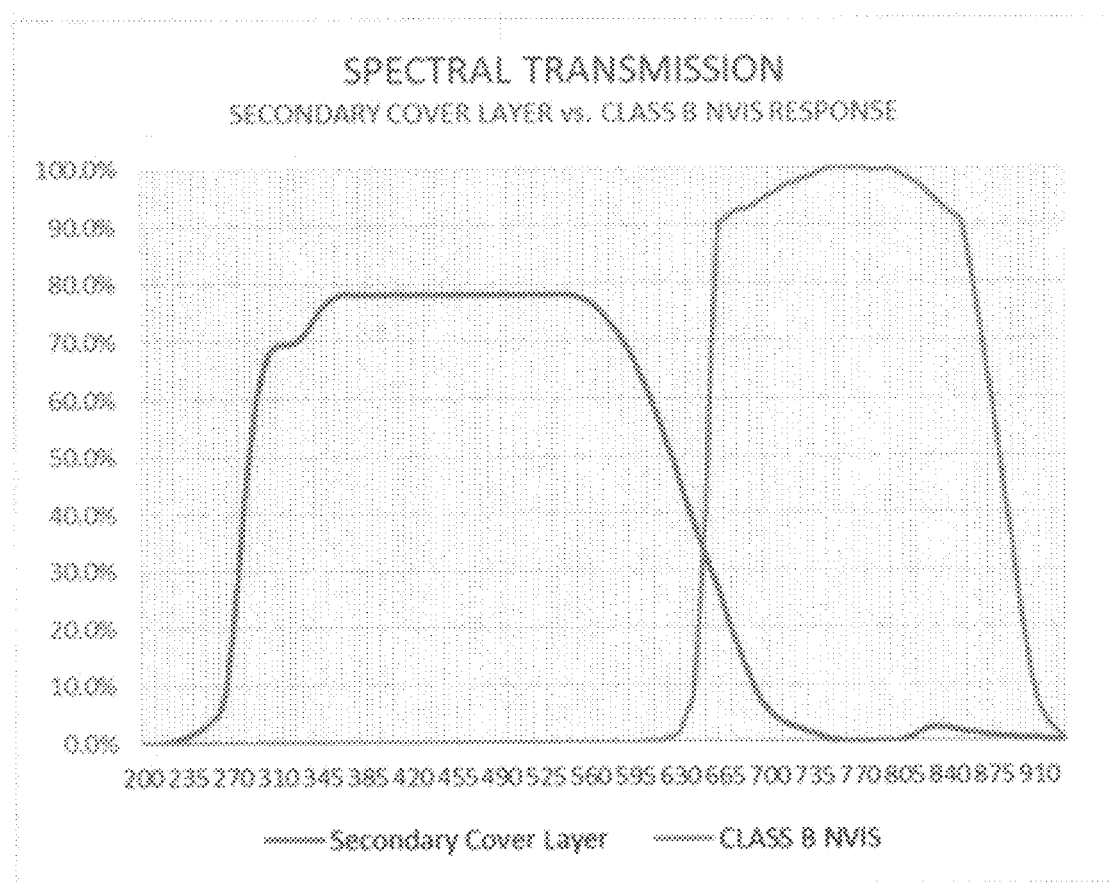

FIG. 5C shows the amount of near infrared absorption needed to assure NVIS radiance compliance to MIL-STD-3009 for Class B Night Vision Imaging equipment 500C. This figure may assume a light source with a limited IR emission. For example, the energy of the IR emission may be less than 10% of the energy emitted in the visible and ultraviolet spectrum.

In other embodiments, the secondary lens 460 may be crafted using other forms of manufacturing such as extrusion and/or molding using acrylic or another suitable material.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A compact switch comprising:
   a pushbutton and a pushbutton end opposite an electrical contact pin end;
   the pushbutton for moving an actuator constrained to move along a first axis, the motion being relative to a housing;
   the actuator for operating an anti-tease mechanism that moves a rack and changes a state of an electrical contactor in a contactor array;
   an actuator side projection that engages a cam movable in the housing;
   cam movement being responsive to the side projection moving in a curvilinear cam track;
   a single flexible circuit extending between the pushbutton and a first set of electrical contact pins;
   a midsection of the flexible circuit extending along a sidewall of the housing, the midsection bearing electrical rectification devices;
   primary and secondary actuator levers; and,
   secondary actuator lever springs interconnecting the primary and secondary actuator levers;
   wherein during compact switch operation, the side projection moves in the curvilinear cam track such that electrical contacts in the contactor array move between a first and a second state, the first and second states being bistable states.

2. A compact switch comprising:
   a pushbutton and a pushbutton end opposite an electrical contact pin end;
   the pushbutton for moving an actuator constrained to move along a first axis, the motion being relative to a housing;
   the actuator for operating an anti-tease mechanism that moves a rack and changes a state of an electrical contactor in a contactor array;
   an actuator side projection that engages a cam movable in the housing;
   cam movement being responsive to the side projection moving in a curvilinear cam track;

a single flexible circuit extending between the pushbutton and a first set of electrical contact pins;

a midsection of the flexible circuit extending along a sidewall of the housing, the midsection bearing electrical rectification devices;

the cam between a first biasing spring that is a spring plate and a second biasing spring that is a "C" shaped spring; and, the actuator passing between the second biasing spring and a cam surface that exposes the curvilinear track.

3. The compact switch of claim 2 wherein:

the "C" shaped spring has opposed ends; and, the opposed ends are constrained such that the actuator is biased with a force attributable in part to the constrained ends.

4. The compact switch of claim 3 further comprising:

a fixing screw passing through a tang and engaging a housing collar, the tang for securing the switch to a mounting panel;

wherein the compact switch is secured when the fixing screw passes through the collar, one or both of the fixing screw and collar being heated to pass the screw through the collar and one or both of the fixing screw and the collar being cooled to fix the screw in the collar.

5. A compact switch comprising:

a pushbutton and a pushbutton end opposite an electrical contact pin end;

the pushbutton for moving an actuator constrained to move along a first axis, the motion being relative to a housing;

the actuator for operating an anti-tease mechanism that moves a rack and changes a state of an electrical contactor in a contactor array;

an actuator side projection that engages a cam movable in the housing;

cam movement being responsive to the side projection moving in a curvilinear cam track;

a pushbutton display assembly including a lens assembly;

the lens assembly having a viewable side and a lighted side;

the viewable side being an outermost surface of a primary lens;

the lighted side being an outermost surface of a secondary lens;

the primary lens innermost surface facing an indicia layer; and, the secondary lens innermost surface facing an adhesive layer;

wherein the primary lens thickness is between 0.020 and 0.025 inches, an indicia layer thickness is between 0.002 and 0.006 inches, an adhesive layer thickness is less than 0.001 inches, and a secondary lens thickness is between 0.105 and 0.130 inches.

6. The compact switch of claim 5 wherein the primary lens is made from cell cast PMMA with 1 to 2 percent molecular cross linking and includes ultra-violet light absorbing dyes for absorbing about 95% of incident spectral irradiance.

7. The compact switch of claim 6 wherein a primary lens outermost surface includes pattern scoring that measures 70-80 gloss units.

8. The compact switch of claim 7 wherein primary lens glare control is about 2 to 3 percent of incident light intensity when the incident light is directed at 45 degrees relative to normal viewing.

9. The compact switch of claim 8 wherein a primary lens innermost surface includes pattern scoring that measures 60-65 gloss units.

10. The compact switch of claim 9 wherein the indicia layer provides digitally printed readable characters using a UV curable ink with a first or foreground color that is optically translucent and constructed by an RGB color component ratio system.

11. The compact switch of claim 10 wherein the indicia layer includes a second or background color that is optically opaque and constructed by an RGB color system.

12. The compact switch of claim 11 wherein photopic light transmittance of the first color is varied while photopic light transmittance of the second color is less than 0.001 percent.

13. The compact switch of claim 12 wherein the adhesive layer includes a UV curable component.

14. The compact switch of claim 13 wherein the secondary lens includes clear cell cast PMMA.

15. The compact switch of claim 13 wherein the secondary lens includes absorption dyes for a near infrared portion of electromagnetic spectrum.

16. The compact switch of claim 14 wherein the secondary lens excludes absorption dyes for an ultraviolet portion of electromagnetic spectrum.

17. The compact switch of claim 13 wherein secondary lens spectral transmission is less than 10 percent above 700 nm, less than 10 percent below 250 nm, and more than 75% between 350 and 550 nm.

18. The compact switch of claim 17 wherein a UV curable adhesive layer is curable by exposing the outermost surface of the secondary lens to UV light but is not curable by exposing the outermost surface of the primary lens to UV light.

* * * * *